US006960983B2

(12) United States Patent
Mardirossian (10) Patent No.: US 6,960,983 B2
(45) Date of Patent: *Nov. 1, 2005

(54) GLOBAL PAGING SYSTEM USING PACKET-SWITCHED DIGITAL DATA NETWORK AND REMOTE COUNTRY DESIGNATION

(75) Inventor: Aris Mardirossian, Germantown, MD (US)

(73) Assignee: Technology Patents, LLC, Derwood, MD (US)

( * ) Notice: Subject to any disclaimer, the term of this patent is extended or adjusted under 35 U.S.C. 154(b) by 127 days.

This patent is subject to a terminal disclaimer.

(21) Appl. No.: 10/664,900

(22) Filed: Sep. 22, 2003

(65) Prior Publication Data

US 2004/0058693 A1    Mar. 25, 2004

Related U.S. Application Data

(63) Continuation of application No. 08/752,624, filed on Nov. 19, 1996, now Pat. No. 6,645,542.

(51) Int. Cl.⁷ .............................................. H04Q 7/14
(52) U.S. Cl. .................. 340/7.29; 340/7.27; 340/7.21; 455/458
(58) Field of Search .............................. 340/7.29, 7.27, 340/7.21, 2.4; 455/458

(56) References Cited

U.S. PATENT DOCUMENTS

| 4,644,347 A | 2/1987 | Lucas et al. |
| 4,644,351 A | 2/1987 | Zabarsky et al. |
| 4,713,808 A | 12/1987 | Gaskill et al. |
| 5,122,795 A | 6/1992 | Cubley et al. |
| 5,237,321 A | 8/1993 | Oliwa |
| 5,243,645 A | 9/1993 | Bissell et al. |
| 5,355,126 A | 10/1994 | Nelson et al. |
| 5,369,681 A * | 11/1994 | Boudreau et al. ........ 455/456.1 |
| 5,379,030 A | 1/1995 | Nolan et al. |
| 5,392,452 A | 2/1995 | Davis |
| 5,396,643 A | 3/1995 | Frenzer et al. |
| 5,436,960 A | 7/1995 | Campana, Jr. et al. |
| 5,487,100 A | 1/1996 | Kane |
| 5,493,286 A | 2/1996 | Grube et al. |
| 5,519,706 A | 5/1996 | Bantz et al. |
| 5,537,407 A | 7/1996 | Park et al. |
| 5,543,785 A | 8/1996 | Vatt et al. |
| 5,548,814 A | 8/1996 | Lorang et al. |
| 5,552,779 A | 9/1996 | Gaskill et al. |
| 6,646,542 B1 * | 11/2003 | Mardirossian ............. 340/7.29 |

OTHER PUBLICATIONS

U.S. Appl. No. 08/752,624, filed Nov. 19, 1996.

* cited by examiner

Primary Examiner—Edwin C. Holloway, III
(74) Attorney, Agent, or Firm—Nixon & Vanderhye P.C.

(57) ABSTRACT

A global paging system and corresponding method are disclosed in which an originating user pages a receiving user in a different country without the paging message being broadcast in all areas. According to certain embodiments, the originating user E-mails a web site or server of the paging system paging information, with the server then transmitting the paging message over a packet-switched digital data network (e.g. the Internet) to a receiving or terminating web site or server located in the different country. In certain embodiments, the receiving user remotely inputs a designated country into the paging system so that when the receiving user is paged, the paging system first pages the receiving user in the designated country or area without broadcasting the paging message in other countries or areas.

3 Claims, 6 Drawing Sheets

PC SCREEN

> Please enter list of all countries you wish to reserve for designation in the order in which you wish them to be payed absent a specific country designation.

1. USA
    2. Canada
    3. UK
    4. Japan
    5. Germany
    6. S. Korea
    7. Australia
    8. India
    9. Brazil
    10. Panama
    11. Mexico
    12. France
    13. \_\_\_\_\_\_
       ∧

GLOBAL PAGING SYSTEM USING PACKET-SWITCHED DIGITAL DATA NETWORK AND REMOTE COUNTRY DESIGNATION

This application is a continuation of application Ser. No. 08/752,624, filed Nov. 19, 1996, now U.S. Pat. No. 6,645,542 the entire disclosure of which is hereby incorporated herein by reference in this application.

This invention relates to a paging system and corresponding method of use. More particularly, this invention relates to a global paging system utilizing a land-based packet-switched digital data network (e.g. the Internet) and a feature for permitting subscribers to remotely designate countries in which they are, or expect to be, located. According to certain alternative embodiments, the instant invention enables cellular phone conversations to take place country-to-country over a packet switched digital data network, with the callee being able to pre-designate which country(ies) he/she is able to receive calls in, or expects to be located.

BACKGROUND OF THE INVENTION

Paging systems and the like are old and well-known. For example, see U.S. Pat. Nos. 5,396,643; 5,392,452; 5,552,779; and 5,548,814, the entire disclosures of which are hereby incorporated herein by reference.

U.S. Pat. No. 5,396,643 discloses a geographic-area selective satellite based paging system and corresponding method. A terminator having a pager for receiving messages selects a long-term preferred geographic area and a short-term preferred geographic area. Alternatively, a paging originator may select a customized geographic-area into which to broadcast paging information. Thus, the area to which the page is broadcast is limited. When the terminator leaves his normally preferred geographic-area, he may call a gateway and provide a short-term preferred geographic-area. Unfortunately, the paging system of the '643 patent suffers from at least the following problems: (i) the satellite communication system which is utilized is both costly and may become unreliable in certain situations; (ii) the hardware and software needed for satellite access and use is complicated, costly, and subject to breakdown; (iii) when pages to the terminator are unanswered, the originator must blindly select a customized geographic-area in which the page is attempted; (iv) only two geographic-areas, the long-term and short-term areas, may be stored and/or adjusted by the subscriber; (v) the system may be difficult to implement in many foreign countries; and (vi) satellite communications are not cost-effective in circumstances akin to the invention described below.

U.S. Pat. No. 5,493,286 discloses a system for providing communications based on geographic location. Unfortunately, the system and method of the '286 patent would not be particularly useful in a global network, do not permit the subscriber to remotely select or designate countries in which he or she will most likely be, and is based on inherently limited radio frequency (RF) communications.

U.S. Pat. No. 5,552,779 discloses a wide area paging system in which paging messages input in one local area can be broadcast to a receiver in another local area without necessarily broadcasting the message in all areas. Provided in the system of the '779 patent are a plurality of pagers and means for transferring paging requests from one local area to another where the intended recipient of the paging request is currently located. Associated with each local area transmitter are a subscriber storage means for storing a unique identifying address and a current location for each resident pager. Thus, a paging message for a paging receiver normally residing in a first local area, but temporarily located in a second local area, is broadcast by the transmitting means serving the second local area. For example, in the '779 patent disclosure, the receiving user may telephone the system and thereafter be prompted by computer voice to enter the telephone number from which he is calling, including the country code, city or area code, and the local number. Entry of the phone number allows the paging system to know where to send the receiving user's messages. If there is no broadcast coverage in the area entered, the receiving user will be so informed and the messages will not be sent. Additionally, the disclosure of the '779 patent includes a "roam mode" which is utilized when the receiving user travels outside of his home or standard area.

Unfortunately, the paging system of the '779 patent is lacking for at least the following reasons: (i) other than the roaming feature, the receiving user cannot input into the system designated country locations where he or she expects to be in the future; (ii) the '779 system would be inefficient if utilized on a global basis; (iii) the '779 system does not permit the service provider to bill users or subscribers on a country-designation, or extent of coverage, basis; (v) the system for forwarding pages is burdensome, time consuming, and inefficient; and (vi) the roam feature is undesirable and expensive.

It is apparent from the above that there exists a need in the art for a more efficient global paging system in which potential receiving users or subscribers may remotely input country designations in which they are to be paged, and/or may remotely input a list of countries in which they desire paging services. Furthermore, there exists a need in the art for a more cost efficient and simplistic paging system which does not utilize costly and complex satellite technology and/or transmission-suspect data networks.

Regarding cellular phone embodiments of this invention, it has been disclosed in publications to conduct phone-to-phone conversations over the Internet. However, this would be inefficient for cellular phone systems when the callee may be in any one of a plurality of foreign countries, his exact whereabouts not being known to the caller. In such a situation, it would be desirable to not require the callee's cellular phone to continuously have to update the system via roaming, for example as to its location, as this is expensive and inefficient.

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a method of paging a receiving user via a packet-switched digital data network, the method comprising the steps of:

a) an originating user E-mailing a paging signal to a first web site or server of a paging system, the first server located in a first country and the paging signal including a pager I.D. of a pager belonging to the receiving user and a paging message to be sent to the pager;

b) designating a second country in which the receiving user is to be paged;

c) the first web site or server transmitting the pager I.D. and the paging message over a land-based packet-switched digital data network to a second web site or server located in the designated second country; and d) the second server in the designated second country causing a wireless transmitter located in the second country to attempt to page the pager of the receiving user.

This invention will now be described with reference to certain embodiments thereof as illustrated in the following drawings.

DETAILED DESCRIPTION OF CERTAIN EMBODIMENTS OF THIS INVENTION

Referring now more particularly to the accompanying drawings in which like reference numerals indicate like parts throughout the several views.

The instant invention is related to a global paging system which utilizes a land based packet-switched digital data network (e.g. the internet) to transmit paging data around the world so that subscribers to the system or receiving users may be paged in different countries around the world, regardless of whether the caller or originating user knows the exact whereabouts of the receiving user. The term "receiving user" (RU) is used herein to define the recipient of a page or cellular phone call. Meanwhile, the term "originating user" (OU) is used herein to describe the person or party who originates a page or cellular phone call, i.e. the one who desires to page or call the receiving user.

When the originating user contacts the paging gateway, via either the public switched telephone network (PSTN) or e-mail 15 to attempt a page, he or she inputs the I.D. of the receiving user's pager along with a paging message. According to certain embodiments of this invention, the paging system is able to page the receiving user in a plurality of different countries around the world, regardless of whether the originating user knows or inputs the country in which the receiving user is located. According to this invention, the RU is paged in one country at a time (or in one coverage area at a time) so that the system does not simultaneously page the RU all over the world.

Once the paging gateway is accessed by the originating user, a web site or server 9 with access to a land-based digital data network, such as the internet, transmits to a receiving server or web site over digital data network 3 a paging information signal, e.g. a packetized digital data signal, that includes the pager's I.D., the paging message, country data indicative of the country to which paging is first to be attempted, and data indicative of the addressable coverage area in the country to be paged.

Figure 1:
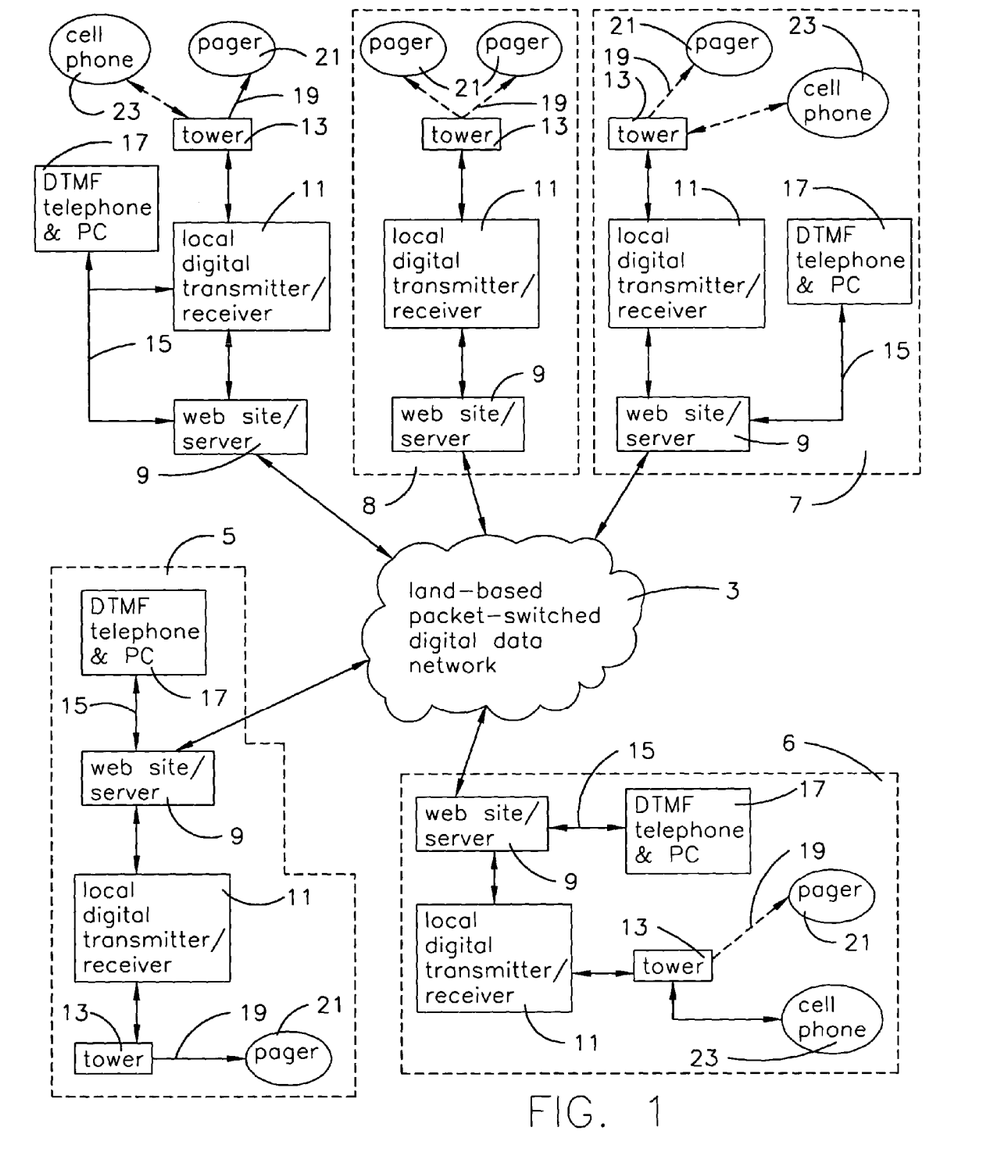
FIG. 1 is a block diagram/schematic of a global paging system or network according to certain embodiments of this invention.

FIG. 1 illustrates a global paging system according to certain embodiments of this invention. As shown, the paging system includes land-based packet-switched digital data network (e.g. the Internet) 3 which interconnects a plurality of different addressable coverage areas 5–8, each of areas 5–8 being located in a different country around the world according to certain embodiments of this invention. It will be recognized by those of skill in the art however that additional coverage areas are also provided in the FIG. 1 paging system, with numerous coverage areas being located in a particular country in certain embodiments. For example, about 200 coverage areas may be located in the U.S. while only 15 are located in the U.K., and 4 in Mexico. Each coverage area may have its own server or web site 9 according to certain embodiments of this invention, or alternatively, each country may be provided with only one server 9 regardless of the number of coverage areas in each country.

The global paging system includes at least one web site or server 9 located in each illustrated coverage area in certain embodiments, at least one digital transmitter/receiver 11 located in each coverage area, at least one paging transmitter or tower 13 located in each coverage area, a communication link (e.g. PSTN or internet) 15 in each coverage area 5–8 for allowing originating users (OUs) to access the gateway in order to page a selected receiving user (RU), and at least one DTMF telephone and/or PC 17 for allowing originating users to access the gateway in order to page desired RUs. Each transmitting (or receiving) tower 13 is for sending out a paging signal 19 (via radio frequency, microwave, etc.) to a selected pager 21 of the receiving user in an appropriate coverage area.

According to alternative embodiments of this invention, cellular phones 23 may be used instead of pagers, wherein the system shown in FIG. 1 may be utilized to enable cellular telephone calls to take place around the world via network 3 regardless if the originating user knows the country in which the receiving user is located (and no roaming feature is needed). In cell phone embodiments, each tower 13 represents a cell phone tower for transmitting/receiving digital data to and/or from cell phone(s) 23.

In operation, the FIG. 1 system may work as follows. An originating user utilizes his/her conventional DTMF telephone 17 and calls a local telephone number of the paging service (e.g. 1-800-444-0000) in order to access a local web site or server 9 of the paging service. Alternatively, the originating user may use his or her PC 17 to access the paging system via a modem (not shown). Alternatively, the OU, from his/her own web site on network 3, may E-mail or otherwise access the system via link 15. According to still other embodiments, the OU may simply use his DTMF phone and dial the number (e.g. 212-xxx-yyyy) of the RU's pager and thereafter input the paging message to a server 9 when prompted.

After the originating user (OU) telephones or E-mails an originating web site or server 9 in his local (or distant) coverage area or country, server 9 prompts the OU to input a paging message, the I.D. of the receiving user's pager 21, and the country or coverage area where the RU is located if this is known to the OU. The OU, via DTMF for example, then inputs the paging message, the RU's pager I.D., and when possible the country or coverage area data where the RU is located. According to electronic-mail (E-mail) embodiments using network 3 as link 15, the OU may E-mail the RU's pager I.D., paging message, and/or the country where the RU is believed to be located to the local or remote web site or server 9 accessed (i.e. originating server) so that only one transmission to the web site 9 is required.

When the OU inputs the location of the RU (via country or coverage area data), web site or server 9 then accesses packet-switched digital data network 3 and transmits receiving site 9 I.D. data, the pager I.D., and the paging message data over network 3 to the receiving or terminating web site or server 9 in the country or coverage area (i.e. one of 5–9) input by the OU. Once the terminating web site or server 9 in the country where the RU is located is given the pager I.D. and paging message, this terminating server transmits or causes paging message and I.D. data to be transmitted 11 to the appropriate transmitting tower 13, and instructs or causes the tower to page the RU in its coverage area and deliver the paging message.

According to certain embodiments, only one web site or server 9 is provided in each country along with a transmitter/receiver 11, while a plurality of different towers 13 are provided in each country thereby allowing the server 9 to decide which tower is located in the coverage area designated by the OU or RU. According to certain embodiments, the terminating site 9 causes all towers to simultaneously page the RU in all of the country's coverage areas.

If a transmitting tower 13 receives confirmation that the RU's pager 21 has been accessed, then the tower sends the RU's pager 21 the paging message originally input to the system by the OU via RF, microwave, or the like. In such a manner, an OU may page an RU in any country around the world serviced by the FIG. 1 paging system when the OU knows the whereabouts or the RU.

In accordance with E-mail embodiments, the OU never needs to use a phone, but simply E-mails paging data (e.g. pager I.D., paging message, country to page RU in, etc.) to an originating web site 9 in the paging system which takes care of the rest.

Let us now turn to the situation where the OU does not know the whereabouts of the RU. In this scenario, the OU accesses an originating web site or server 9 of the paging system via E-mail or DTMF in the same manner as set forth above, but cannot and does not enter the country or coverage area where the RU is located (i.e. the OU does not know where the RU is located). While this process will be described in more detail below, a brief summary of the process in this situation follows.

The originating web site or server 9 accessed by the OU first looks up in its or the system's memory to see if the RU has input into the paging system his or her expected whereabouts (i.e. if the RU has designated a country, or in what country the RU may be located). If the system has stored such information, then server 9 retrieves it and utilizes network 3 to access the web site or server 9 in the designated country or area where the RU may be located. The site or server accessed in this area then communicates with the appropriate tower and attempts to page the RU. When the RU's pager is accessed, the communication is completed with the paging message being transmitted to the RU's pager 21.

However, when the RU's pager 21 cannot be accessed in the designated area, the receiving server (RS) 9 in this designated area transmits rejection or non-connect data back to the originating server (OS) 9 via network 3. Thereafter, the originating server 9 retrieves the country or access area list previously input by the RU and attempts to page the RU in the countries or access areas found on the RU's list in the order in which they are set forth (e.g. see FIG. 3). The system goes through each country or area on the RU's list and attempts pages of the RU either until the system reaches the RU's pager 21 or until the system has gone through the RUs list of countries or coverage areas a predetermined number of times (e.g. two). Optionally, when a connection is made with the RU's pager 21, a confirmation E-mail message is sent back to the OU's web site if he/she has one.

Figure 2:
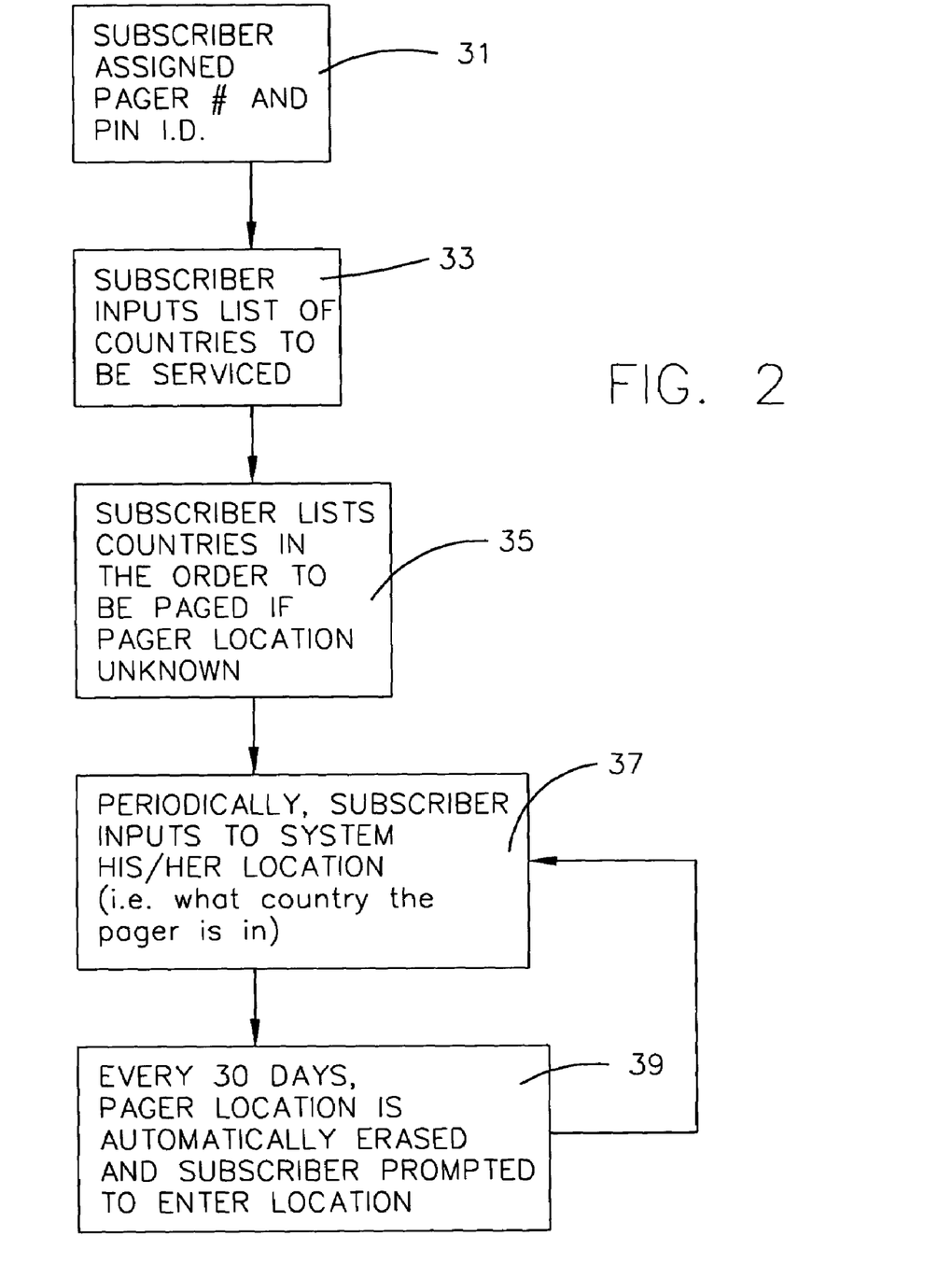
FIG. 2 is a flowchart illustrating how subscribers to the FIG. 1 system may input a list of countries in which paging service is desired and/or designate particular countries in which to be paged for a predetermined period of time.

FIG. 2 is a block diagram/flow chart illustrating how a subscriber (RU) subscribes to the pager system and inputs particular location data according to certain embodiments of this invention. When the subscriber or RU first subscribes to the paging system of FIG. 1, he or she is assigned a pager # (e.g. 212-xxx-yyyy) and a pin I.D. at 31. Following this assignment, the subscriber or RU inputs his or her "list" of countries to be serviced at 33. The RU will typically list all countries or coverage areas 5–9 at 33 that he or she wishes to be reachable in by way of the paging system. In other words, the RU may not be paged in a country or coverage area unless that country or area is listed in step 33 (or is added at a later point in time by the RU calling the system, entering his pin #, and amending his or her list).

Then, or at the same time, the RU at 35 lists the countries in the order he or she wishes that they be accessed in the event that no country or area has been designated. In other words, in step 35 the RU lists his or her accessible countries in the order in which he or she is most likely to be in them. For example, if the RU spends most of his time in the U.S. and Japan, the next most amount of time in France, some time in the U.K., Spain, Brazil, and Australia, and very little time in Mexico, the RU would likely, in step 35, list his/her countries in the following order:

1. United States
2. Japan
3. France
4. Spain
5. United Kingdom
6. Brazil
7. Australia
8. Mexico Given such a list, the RU may only be paged in these eight countries. In the event that no country is currently "designated" by the RU, the system will attempt to page the RU first in the U.S. a predetermined number of times, then in Japan said predetermined number of times, then in France said predetermined number of times . . . and finally in Mexico said predetermined number of times. The system will attempt pages in these countries and will repeat this process until either the RU's pager is accessed and acknowledges receipt of a page, or until the list has been gone through a predetermined number of times (e.g. two).

After the RU has been entered into the system, given a pager, and is able to be paged, he/she may periodically enter into the paging system a "designated country" (i.e. what country the RU is in or expects to be in) at 37. For example, when the user leaves the U.S. and travels to Australia on business, the RU may access a server 9 in the system via E-mail or DTMF telephone, input his/her pin#, and then input or designate Australia as a "designated country." When this is done, the paging system will first attempt to page the RU in Australia each time he/she is paged by an OU. If the RU cannot be reached in Australia (i.e. the designated country), the system resorts to the list input at 33 in the order input at 35 and attempts to page the RU.

As shown in step 39, designated country data input by the RU is automatically erased after a predetermined period of time (e.g. 30 days). When deletion occurs, the system automatically pages the RU and informs the RU that his/her designated country data has been deleted from the system. At this point in time, the RU may E-mail or call up any web site or server 9 in the paging system and either renew his designated country or enter a new designated country or coverage area.

Figure 3:
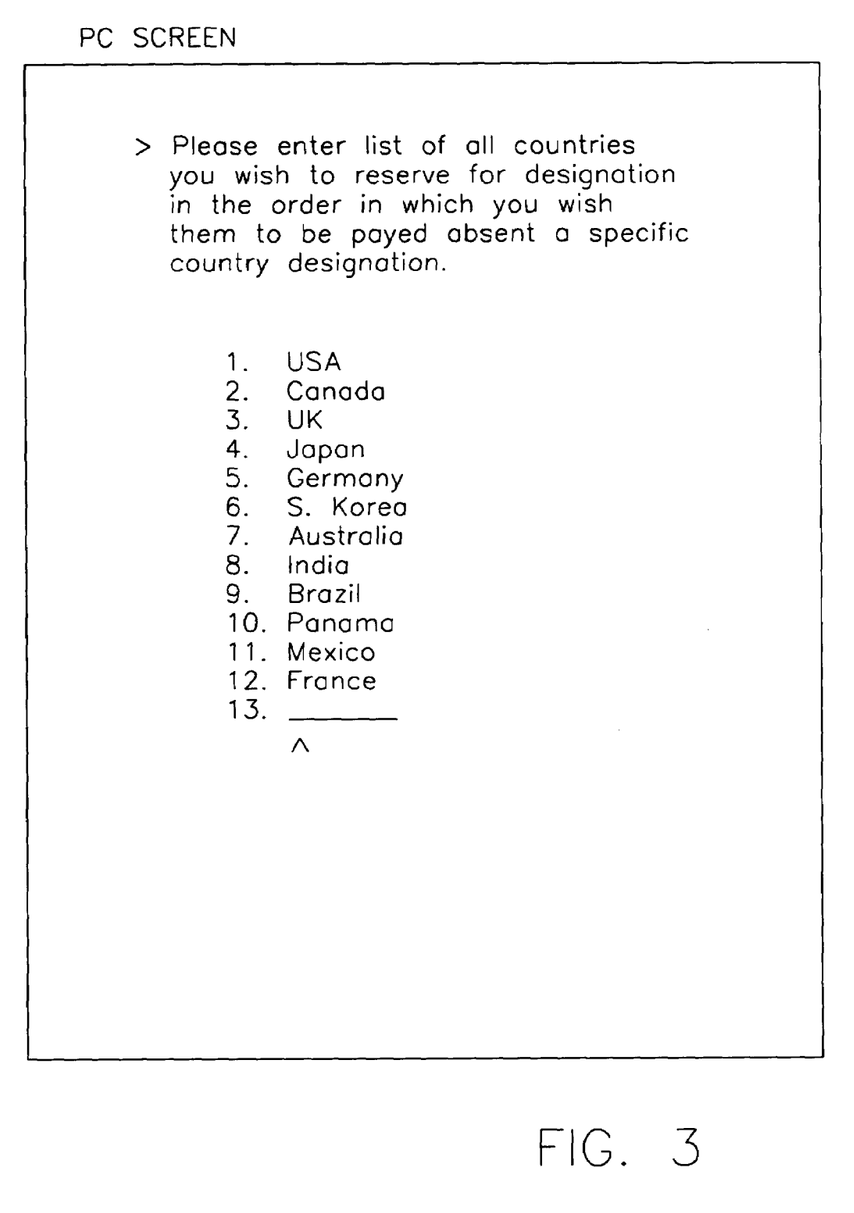
FIG. 3 is an illustration of a PC screen prompting subscribers to input a list of countries for service in the order in which paging is to be carried out absent a specific country designation.

FIG. 3 illustrates a computer or PC screen shown to the RU prompting the RU to list his/her countries in the order discussed above in steps 33 and 35. An exemplary list of countries input by an RU is also shown in FIG. 3.

Figure 4:
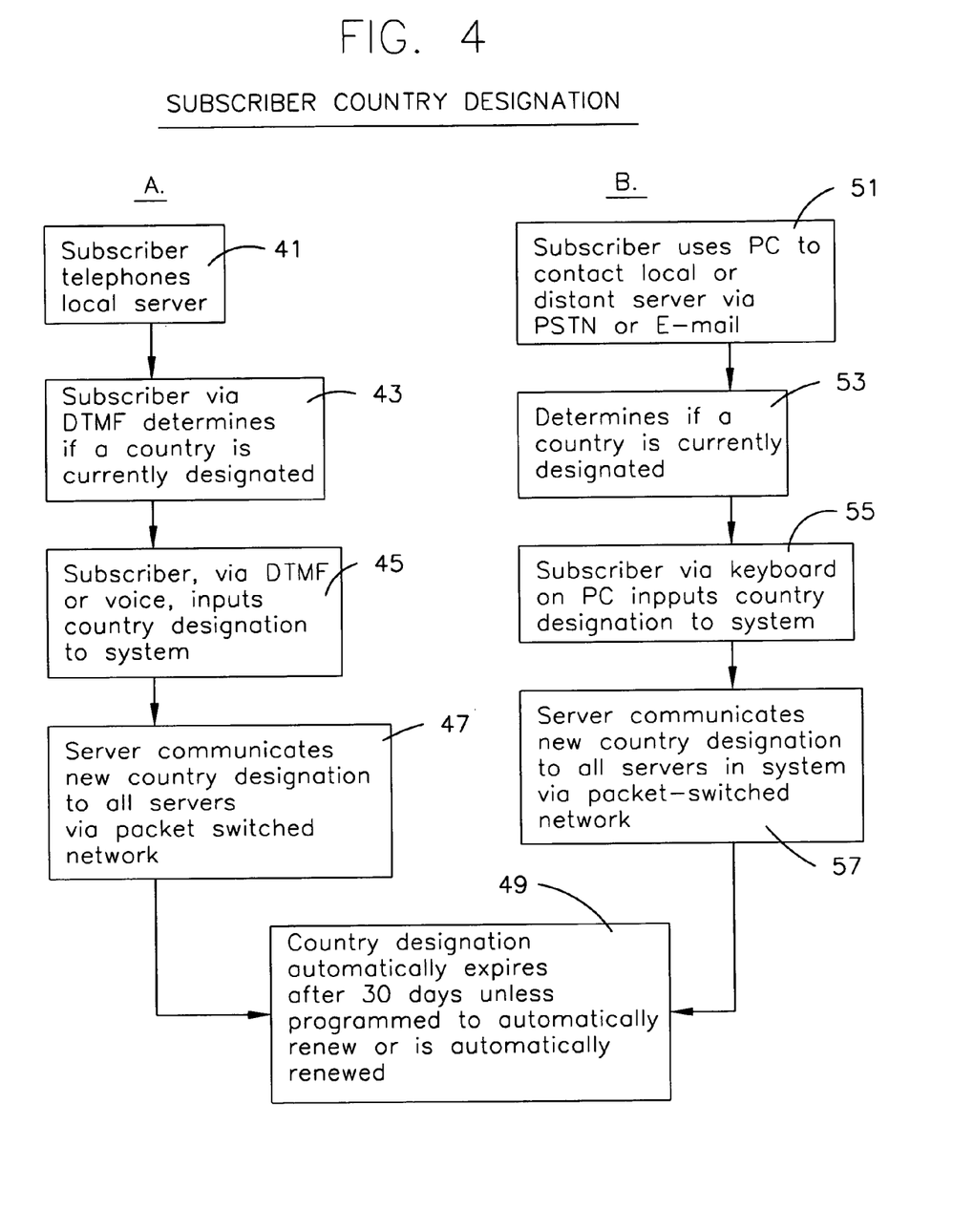
FIG. 4 is a block diagram/flowchart illustrating two methods in which the subscriber may input country designation data into the FIG. 1 paging system.

FIG. 4 is a flow chart illustrating how a subscriber or RU may "designate" a country to first be paged in according to certain embodiments of this invention. Two different methods are shown in FIG. 4, methods A and B. According to method A, the subscriber or RU first telephones (or E-mails) any web site or server 9 of the system in step 41. In step 43, the remotely calling subscriber may determine via DTMF input whether or not a country or coverage area is currently designated in his or her account. Then, in step 45, when no country is currently designated or the subscriber wishes to designate a new country, the subscriber inputs a new country for designation to the server by way of either DTMF or voice input. Optionally, the server may require the remotely calling subscriber to input his or her pin I.D. number for confirmation and/or security purposes. After the designated country has been entered in step 45, the server 9 communicates the new country designation in step 47 to all other servers in the FIG. 1 paging system via network 3, each of the sites 9 storing the information in their memory in certain embodiments. As discussed above, country designations may automatically expire after a predetermined period of time (e.g. thirty days) unless renewed or programmed to be automatically renewed. See step 49.

Method B in FIG. 4 illustrates another process for designating a country. Firstly, in step 51, the subscriber, using his PC, communicates with a server 9 in the paging system via either E-mail or a modem via the PSTN. Thereafter, in step 53 the subscriber determines if a country is currently designated in his account. In step 55, the subscriber either renews his designation, or enters a new country to be designated via E-mail or the PSTN using his PC's keyboard. Then, in step 57, the server 9 which had been in communication with the remotely calling subscriber communicates via network 3 the new designated country for the user's account to all servers in the paging system which store same.

Figure 5:
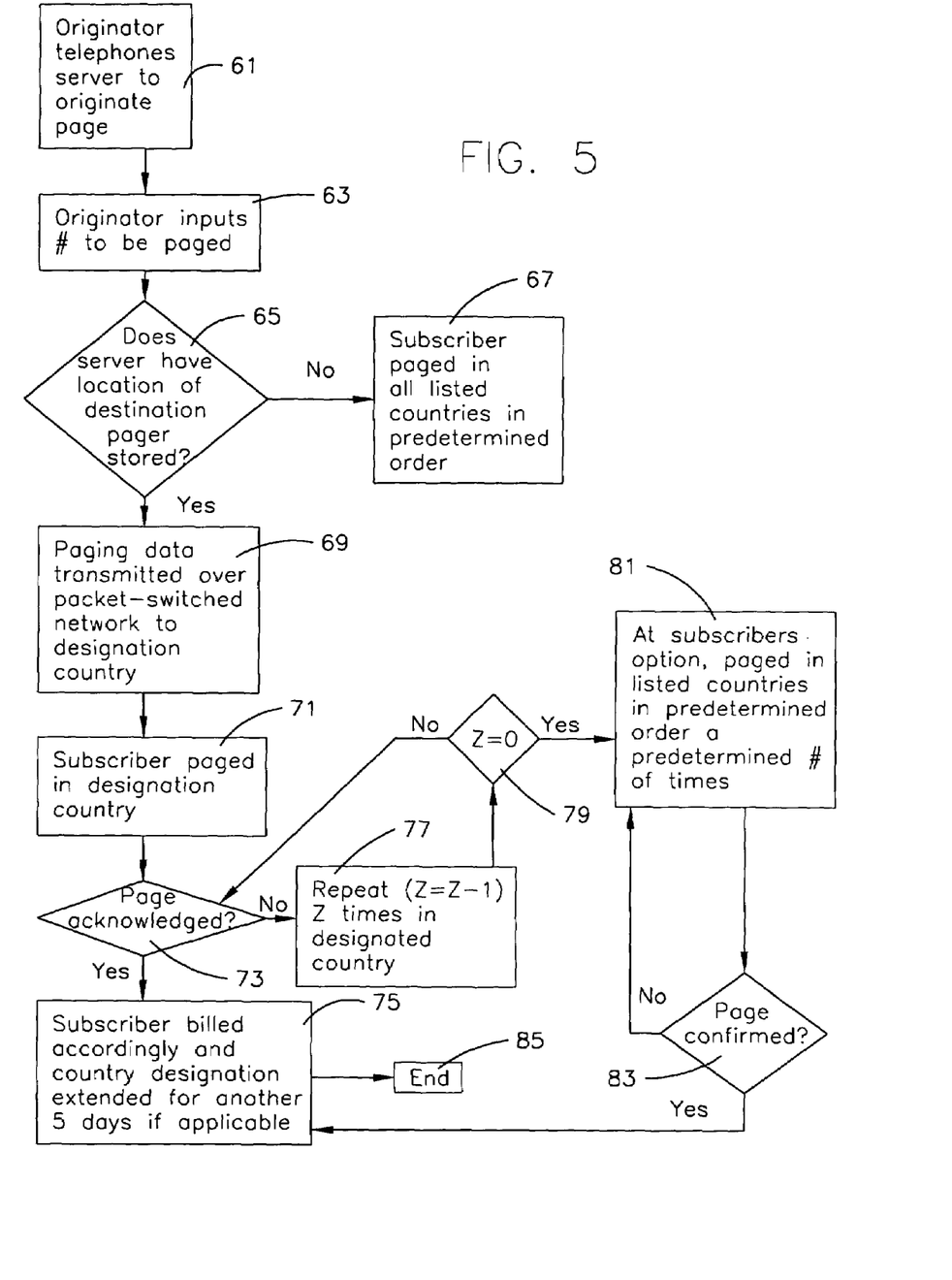
FIG. 5 is a flowchart showing how paging is carried out according to the FIGS. 1–4 system of this invention.

FIG. 5 is a flow chart illustrating how a page is carried out according to certain embodiments of this invention. Firstly, in step 61, the OU either telephones or E-mails an originating server 9 in order to initiate a page to an RU. In step 63, the OU inputs the I.D. number of the RU's pager, and the paging message. After the RU's pager number has been identified, the originating server 9 in step 65 determines whether or not the RU currently has a designated country that he wishes to be first paged in. If not, the originating server 9 causes the RU to be paged in accordance with his previously entered list of countries in their recited order at 67. See FIG. 3 for an exemplary list. Given the FIG. 3 list, for example, the system will first page the RU in the U.S.A., then in Canada, then in the U.K., etc., until either the RU's pager indicates receipt of a page or until this process has been carried out at a predetermined number of times.

In the event that, in step 65, the originating server 9 determines that a country has been "designated" in the RU's account, the paging data and message is transmitted over network 3 to a remote or terminator server 9 located in the designated country or coverage area at 69. Thereafter, in step 71, the terminator server 9 in the designated country or area causes the RU to be paged via a corresponding tower 13. If the page is acknowledged by the RU's pager in step 73, then the RU or subscriber is billed accordingly in step 75 and his or her country designation is extended for another five days according to one option. If, however, the terminator server 9 in the designated country in step 73 does not receive acknowledgment from the RU's pager, then the terminator server causes the terminating tower to repeat the page a number (Z) of times in the designated country. See step 77. Each time the paging process is repeated in the designated country, the predetermined number being lessened by one after each attempt (Z=Z−1).

When it is determined in step 79 that Z finally equals 0, the system stops attempting to page the RU in the designated country, and retrieves the RU's list of service countries and performs pages therein a predetermined number of times as discussed above in step 81. In step 81, the paging systems continues to page the RU in his listed countries until either receipt of the page is confirmed 83, or until the process has been performed a predetermined number of times. If the page is confirmed, the subscriber is billed accordingly in step 75. According to certain alternative embodiments, if a page is confirmed 83 during the step 81 process, then in step 75 the RU's designated country may be automatically changed so as to correspond to the country or coverage area in which the page was confirmed at 83. After step 75, the transaction is ended 85.

Figure 6:
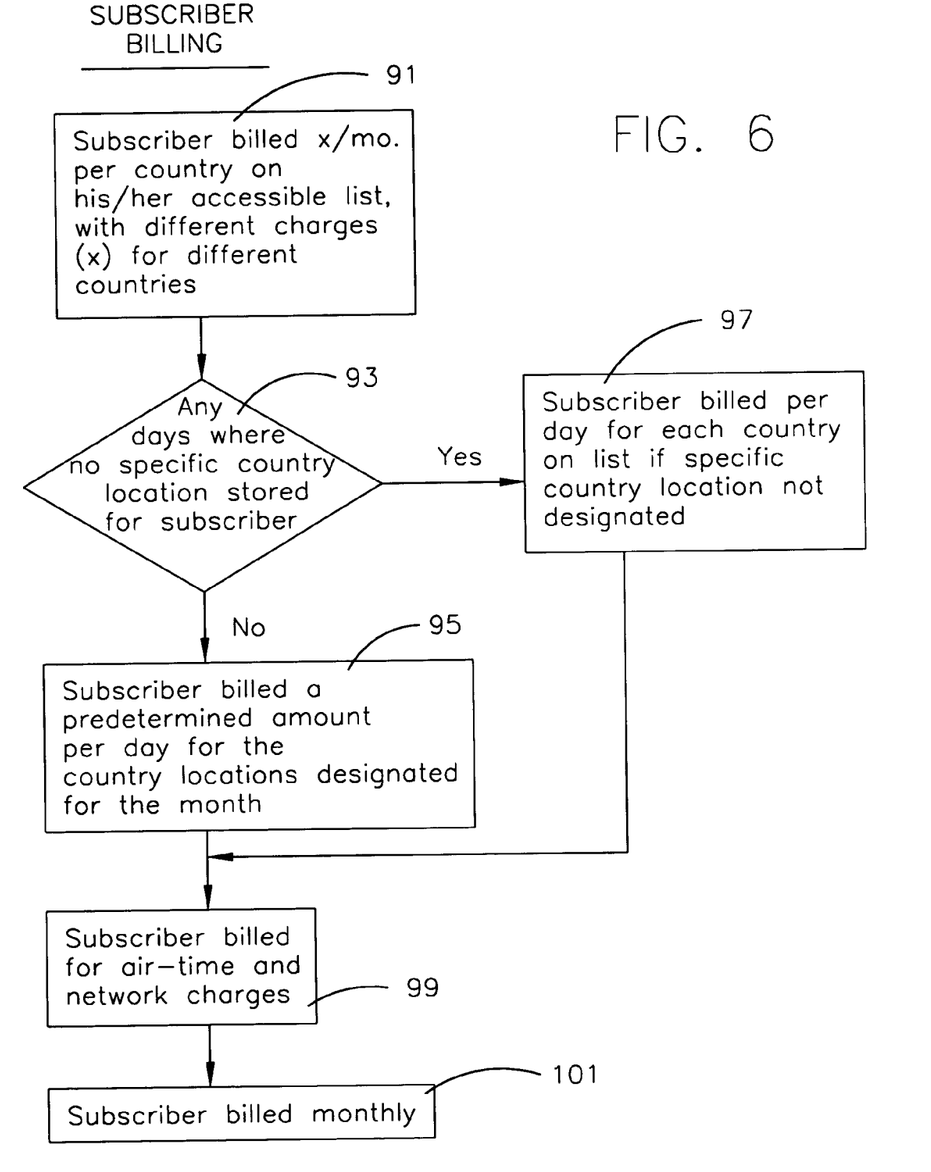
FIG. 6 is a flowchart illustrating how subscribers of the FIGS. 1–5 system are billed in accordance with country coverage and country designations carried out in a particular month.

FIG. 6 is a block diagram/flow chart illustrating how a particular subscriber or RU is billed according to certain embodiments of this invention. Typically, subscribers are billed on a monthly basis. In step 91, the subscriber or RU is billed a predetermined amount per month for each country listed on the RU's "list" (see FIG. 3). Additionally, each country on the RU's list may cost a different amount of money. For example, having the U.S. on one's list may be more expensive per month than Mexico or Brazil. In any event, the RU is billed monthly for his listed countries. In step 93, it is determined whether or not the RU's account had a "designated country" for each day of the applicable month. If a country was designated each day of the month, then in step 95 the RU is billed a predetermined amount per day for the designations. The billing in step 95 is over and above the monthly billing determined in step 91. When it is determined at 93 that, for example, no country was designated in the RU's account for ten days in the applicable month, then, in step 97, the RU is not additionally billed for those ten days. However, in step 97, the RU is additionally billed for the twenty or so days in the applicable month in which a country was designated. Thereafter, in step 99, the RU is billed for the amount of air time used and applicable network charges such as long distance and the like. In step 101, a monthly billing statement is sent to the RU either to his home address or to his web site over net via E-mail.

In accordance with certain cellular telephone embodiments of this invention, one cell phone user 23 may telephone a local web site or server 9 via a corresponding tower 13 and transmitter/receiver 11. Once communicating with the local web site or server 9, the cell phone caller may input the telephone number of a cellular telephone of a callee. Upon receiving the callee's telephone number, the local web site or server 9 looks up in its memory to see if the callee has a "designated" country or coverage area as discussed above. If so, the telephone signal is packetized and transmitted over network 3 to a receiver web site or server in the country or area designated by the callee for depacketizing and transmission via a tower 13 to the callee's cellular phone. In other words, this process is similar to that discussed above with the pagers, except that cellular phone information is transmitted as opposed to paging information. Meanwhile, if the server 9 determines that no country is designated, the system attempts to call the callee's phone in the countries on his or her "list" (see FIG. 3) in the order in which the countries are listed as discussed above. When the callee's cellular phone is finally reached, the caller and callee may carry on a telephone conversation with the voice data being transmitted back and forth between the two respective servers 9 and packet switched digital data network 3. This avoids the need for long distance calling according to certain embodiments of this invention. Billing is carried out for cell phone embodiments in accordance with FIG. 6 as discussed above.

Once give the above disclosure, many other features, modifications, and improvements will become apparent to the skilled artisan. Such other features, modifications, and improvements are, therefore, considered to be a part of this invention, the scope of which is to be determined by the following claims.

I claim:

1. A method of paging a receiving user in a country-selective global paging system, the method comprising:

providing a global paging system spanning a plurality of different countries around the world, the global paging system including a plurality of servers in different countries, each of the servers being in communication with at least one wireless transmitter for transmitting a paging message to a pager of the receiving user;

interconnecting the servers by way of a land-based packet-switched digital data network so as to permit digital communication of signals between the plurality of servers via the packet-switched digital data network;

an originating user telephoning a first web site or server located in a first country in order to page the receiving user who is located in a secondary country different from the first country, the originating user not necessarily knowing what country the receiving user is located in;

the paging system determining if the second country is currently designated by the receiving user as a designated country in which the paging system is to attempt to page the receiving user;

when the paging system determines that the second country has been designated by the receiving user, sending a paging communication over the packet-switched digital data network to a second web site or server in the second country instructing the second web site or server to initiate paging the receiving user in the second country; and when the paging system determines that the second country has not been designated by the receiving user, the paging system initiating paging operations in another country in a predetermined order in an attempt to page the receiving user.

2. The method of claim 1, wherein the digital data network comprises the Internet.

3. The method of claim 1, wherein the receiving user in the second country responds to the page from the second country.

* * * * *